(12) United States Patent
Vogel et al.

(10) Patent No.: US 8,490,952 B1
(45) Date of Patent: Jul. 23, 2013

(54) CONTINUOUSLY VARIABLE NATURAL FREQUENCY AND DAMPING VIBRATION ISOLATION SYSTEM

(75) Inventors: Jerald M. Vogel, Ames, IA (US); Atul G. Kelkar, Ames, IA (US)

(73) Assignee: Vibroacoustics Solutions, Inc., Boone, IA (US)

(*) Notice: Subject to any disclaimer, the term of this patent is extended or adjusted under 35 U.S.C. 154(b) by 2040 days.

(21) Appl. No.: 11/187,366

(22) Filed: Jul. 22, 2005

Related U.S. Application Data

(60) Provisional application No. 60/590,715, filed on Jul. 23, 2004.

(51) Int. Cl.
  *F16F 9/04* (2006.01)
  *B60G 17/052* (2006.01)

(52) U.S. Cl.
  USPC ............ 267/64.27; 267/64.28; 280/5.514

(58) Field of Classification Search
  USPC .......... 188/297, 298; 267/64.25, 64.27, 267/64.28, 122, 123, 124, 126, 64.13, 64.15, 267/64.16, 64.18, 64.19, 64.21, 64.22, 64.23, 267/64.24, 131; 280/5.514, 124.157, 124.158, 280/124.159, 124.16, 124.161
  See application file for complete search history.

(56) References Cited

U.S. PATENT DOCUMENTS

| | | | | |
|---|---|---|---|---|
| 3,065,976 A * | 11/1962 | Vogel | ............ | 280/5.503 |
| 3,722,875 A * | 3/1973 | Hasse | ............ | 267/122 |
| 3,822,908 A | 7/1974 | Gourand | | |
| 3,980,316 A * | 9/1976 | Yates | ............ | 267/64.27 |
| 4,415,179 A | 11/1983 | Marinelli | | |
| 4,468,739 A * | 8/1984 | Woods et al. | ............ | 280/5.514 |
| 4,497,078 A | 2/1985 | Vogel et al. | | |
| 4,669,710 A * | 6/1987 | Horvat | ............ | 267/64.21 |
| 4,678,203 A * | 7/1987 | Rohner et al. | ............ | 267/64.28 |
| 4,733,876 A | 3/1988 | Heider et al. | | |
| 4,834,418 A * | 5/1989 | Buma et al. | ............ | 280/5.506 |
| 4,923,210 A | 5/1990 | Heider et al. | | |
| 5,083,812 A | 1/1992 | Wallace et al. | | |
| 5,169,129 A * | 12/1992 | Hoffman | ............ | 267/64.27 |
| 5,222,759 A * | 6/1993 | Wanner et al. | ............ | 280/124.158 |
| 5,265,907 A | 11/1993 | Tostado | | |
| 5,346,246 A | 9/1994 | Lander et al. | | |
| 5,413,316 A * | 5/1995 | Easter | ............ | 267/64.27 |
| 5,427,347 A * | 6/1995 | Swanson et al. | ............ | 267/140.14 |
| 5,428,533 A * | 6/1995 | Ogawa | ............ | 280/5.515 |
| 5,584,497 A | 12/1996 | Lander et al. | | |
| 5,701,245 A * | 12/1997 | Ogawa et al. | ............ | 280/5.515 |
| 5,732,370 A * | 3/1998 | Boyle et al. | ............ | 267/136 |
| 5,765,859 A | 6/1998 | Nowell et al. | | |
| 5,908,198 A | 6/1999 | VanDenberg | | |
| 5,988,672 A | 11/1999 | VanDenberg | | |
| 6,371,459 B1 * | 4/2002 | Schick et al. | ............ | 267/131 |
| 6,725,983 B2 | 4/2004 | Bell | | |
| 6,733,022 B2 | 5/2004 | Bradshaw | | |
| 2004/0061293 A1 | 4/2004 | Barbison | | |
| 2004/0178587 A1 | 9/2004 | Hiebert et al. | | |
| 2005/0098399 A1 | 5/2005 | Bremner | | |

\* cited by examiner

*Primary Examiner* — Thomas J Williams
(74) *Attorney, Agent, or Firm* — Simmons Perrine Moyer Bergman PLC

(57) ABSTRACT

An apparatus for minimizing the transmission of vibrations from an un-sprung mass object to a sprung mass object through continuous control of system natural frequency and damping ratio including an air spring, a source of high pressure compressible gas, a vacuum source, a variable volume accumulator and a gas flow rate control valve to allow specified gas flow between the air spring and the accumulator thus generating variable system natural frequency and damping ratio.

16 Claims, 12 Drawing Sheets

(a)　　　　　　　　　(b)

CONTINUOUSLY VARIABLE NATURAL FREQUENCY AND DAMPING VIBRATION ISOLATION SYSTEM

CROSS-REFERENCE TO RELATED APPLICATIONS

This application claims the benefit of U.S. Provisional Application No. 60/590,715 filed on Jul. 23, 2004, by J. M. Vogel of Ames, Iowa, and A. G. Kelkar of Ames, Iowa, entitled "Continuously variable natural frequency vibration isolation system".

FIELD OF THE INVENTION

The present invention relates to vibration isolation systems that incorporate compressible fluid springs only in lieu of systems that include combinations of pneumatic, mechanical, and hydraulic spring and damper components. This application provides a purely pneumatic suspension system structure containing multiple degrees of design freedom in the form of natural frequency and damping variables for robust suspension system design for a broad range of suspension applications.

BACKGROUND OF THE INVENTION

Vibration isolation systems for suspension applications typically incorporate combinations of pneumatic, mechanical, and hydraulic components. These components, in combination, must provide a suspension system function that controls a suspended mass dynamic state with position, natural frequency, and damping characteristics necessary for optimal performance.

Exemplary patents of various suspension systems that incorporate pneumatic components include the following patents and patent applications:

U.S. Pat. No. 3,822,908 issued on Jul. 9, 1974, to Rene Gourand describing a suspension system using single or dual air bags having a tapered cross section. The air bags are pressured by an air pump.

U.S. Pat. No. 4,415,179 issued on Nov. 15, 1983, to Joseph A. Marinelli describes an axle and air bag suspension comprising an air spring in conjunction with a front-to-rear trailing mechanism.

U.S. Pat. No. 4,497,078 issued on Feb. 5, 1985, to Jerald M. Vogel et al. describes a purely pneumatic, three-degree-of-freedom isolation system for a sleeper bunk in a truck. The system incorporates three air springs, each with an accumulator for setting natural frequency, and a directional orifice positioned between the air spring and corresponding accumulator that provides two natural frequency settings for each degree of isolation freedom.

U.S. Pat. No. 4,733,876 issued on Mar. 29, 1988, to Merle J. Heider et al. describes a leaf spring supplemented with a pressure controllable air bag supplying variable spring adjustment, variable ride height, and leveling control of an RV.

U.S. Pat. No. 4,923,210 issued on May 8, 1990, to Merle J. Heider et al. describes a leaf spring in conjunction with an air spring for vehicle leveling function. A pneumatic controller directs the air spring state.

U.S. Pat. No. 5,083,812 issued on Jan. 28, 1992, to Donovan B. Wallace et al. describes an air spring suspension for a vehicle for preventing vehicle roll motions.

U.S. Pat. No. 5,265,907 issued on Nov. 30, 1993, to Ray Tostado describes a bolt on auxiliary air spring suspension that assists a factory suspension.

U.S. Pat. No. 5,346,246 issued on Sep. 13, 1994, to Cecil Lander et al. describes an air spring suspension system controller for setting spring rates in conjunction with a leaf spring system.

U.S. Pat. No. 5,584,497 issued on Dec. 17, 1996, to Cecil Lander et al. describes an air spring controller for automatic adjustment of spring rates on a coupled pneumatic/mechanical leaf spring system.

U.S. Pat. No. 5,765,859 issued on Jun. 16, 1998, to Corbett W. Nowell et al. describes a kneeling wheeled suspension system utilizing air springs for lowering truck trailer decks.

U.S. Pat. No. 5,908,198 issued on Jun. 1, 1999, to Ervin K. VanDenberg describes a center beam and air spring suspension system mounted to a suspension frame and providing varying spring rate capabilities.

U.S. Pat. No. 5,988,672 issued on Nov. 23, 1999, to Ervin K. VanDenberg describes an air spring suspension system for an axle application having horizontal, vertical, and axial spring rates.

U.S. Patent Application Publication No. US 2004/0061293 A1, issued on Apr. 1, 2004, to James M. Barbison describes an air suspension system for an RV that comprises air springs and mechanical dampers that provide vehicle leveling function, as well as vehicle ride suspension on road traversing.

U.S. Pat. No. 6,725,983 B2 issued on Apr. 27, 2004, to Stephen H. Bell describes a shock absorber that provides variable damping based on load conditions of a vehicle. The shock absorber is fluidly coupled with the suspension system air springs. Damping rate is adjusted to levels dictated by air spring pressure.

U.S. Pat. No. 6,733,022 B2 issued on May 11, 2004, to Curtis S. Bradshaw describes a sprint car suspension comprising an air spring in a swing-arm four bar linkage mechanism. The air spring further possesses a non-linear spring rate for keeping the vehicle tires firmly on the ground.

U.S. Patent Application Publication No. US 2004/0178587 A1, issued on Sep. 16, 2004, to Grant W. Hiebert et al. describes an air suspension system for an RV that provides a variable, but discrete, ride quality. Vehicle suspension corner components consist of a pair of air springs connected with an anti-dive valve that allows suspension operation using a single air spring or both, thus yielding two stiffness rates, as needed. A controller and accelerometers are used to trigger the anti-dive valve.

U.S. Patent Application Publication No. US 2005/0098399 A1, issued on May 12, 2005, to Ronald D. Bremner describes an active seat suspension system comprising an air spring with fixed accumulator for providing a natural frequency consistent with good ride quality, variable viscous damper for damping control, and a hydraulic ram system for providing seat height control and canceling base accelerations.

Traditional vibration isolation system used to isolate a suspended mass, m, from potential vibrations consists of a mechanical spring with stiffness k, and a damping mechanism with damping coefficient c (FIG. 1). The two parameters, c and k, are adjusted to provide a "best" isolation environment for the suspended mass, normally based on a transmissibility consideration. Hence, a single operational design point is addressed in this isolation system. Excitation frequencies outside the range covered in the design point definition result in a less than satisfactory vibration isolation environment. This phenomenon is readily understood in the following transmissibility analysis for the system.

The dynamic equation of motion for the suspended mass is given by $$\ddot{x}+2\zeta\omega_n(\dot{x}-\dot{z})+\omega_n^2(x-z)=f(t) \quad (1)$$

where the damping ratio, $\zeta$, and natural frequency, $\omega_n$, are functions of the system parameters c, k, and m. The transfer function for the system is given by $$\frac{x(s)}{z(s)} = G(s) = \frac{2\zeta\omega_n s + \omega_n^2}{s^2 + 2\zeta\omega_n s + \omega_n^2} \quad (2)$$

The transmissibility is defined to be the ratio of the g-load generated by the base to the g-load experienced by the suspended mass which can be written as follows:

$$\text{Transmissibility} = \frac{s^2 x(s)}{s^2 z(s)} = \frac{2\zeta\omega_n s + \omega_n^2}{s^2 + 2\zeta\omega_n s + \omega_n^2} \quad (3)$$

FIG. 2 depicts the transmissibility of the system over a range of excitation frequencies, $\omega$. The curves demonstrate the requirement that isolator natural frequency must be tuned to values significantly lower than the major excitation frequency to which the system is subjected. In fact, the natural frequency of the isolator should be set to its smallest possible value for minimum transmissibility. Additionally, the damping of the isolator should be small, if not zero in minimizing transmissibility. The curves also indicate that isolator performance degrades to unsatisfactory levels when excitation frequencies approach isolator resonance values. In fact, amplitude problems near resonance preclude the utilization of small damping rates desired for off-resonance operation.

A complicating factor in the consideration of small natural frequency suspension systems arises from the fact that suspended mass static load deflection is inversely proportional to the spring rate, k. The minimum feasible natural frequency for a suspension isolator is, to a great extent set by suspended mass static deflection demands, thus limiting its transmissibility quality.

In summary, the traditional mechanical spring/damper isolator system is limited to a single design point with performance limitations imposed by other constraints that must be simultaneously satisfied. Isolator performance degrades rapidly as excitation frequencies shift from design point values to near resonance.

SUMMARY OF THE INVENTION

It is an object of present invention to provide a system and method for improving isolation of a suspended mass.

It is a feature of the present invention to use a suspension system having a continuously variable natural frequency.

It is another feature of the present invention to use a system with a continuously variable damping ratio.

It is an advantage of the present invention to provide for improved ability to adjust a suspension system.

It is another object of the present invention to provide a suspension system with additional desirable features.

Some embodiments of the claimed invention incorporate air springs in conjunction with variable volume accumulators, controlled sharp-edged orifices, pressure and vacuum sources to generate a robust vibration isolation system with multiple degrees of design freedom available for optimizing vibration isolation environments. Incorporation of computer controllers and dynamic state sensory components for generating feedback information allows designers to develop optimal suspensions over a broad range of applications. Additional features are included as well.

BRIEF DESCRIPTION OF THE DRAWINGS

The invention may be more fully understood by reading the following description of the preferred embodiments of the invention, in conjunction with the appended drawings wherein.

DETAILED DESCRIPTION

The Continuously Variable Natural Frequency Concept

A continuously variable natural frequency and damping (CVNFD) system, of the present invention, differs from the traditional isolation system in at least two aspects:
1. The CVNFD system has no fixed damping component.
2. The spring utilized in the CVNFD system has a variable spring rate.

In essence, the isolator can operate at continuously variable specified natural frequency levels to provide an optimal isolation environment for a suspended mass subjected to base excitations.

Figure 1:
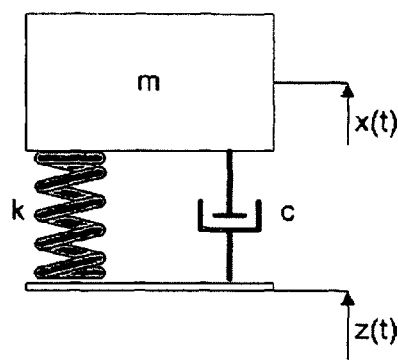
FIG. 1 is a symbolic rendition of a traditional vibration isolation system containing a suspended mass, mechanical spring, viscous damper and a movable base.
Figure 2:
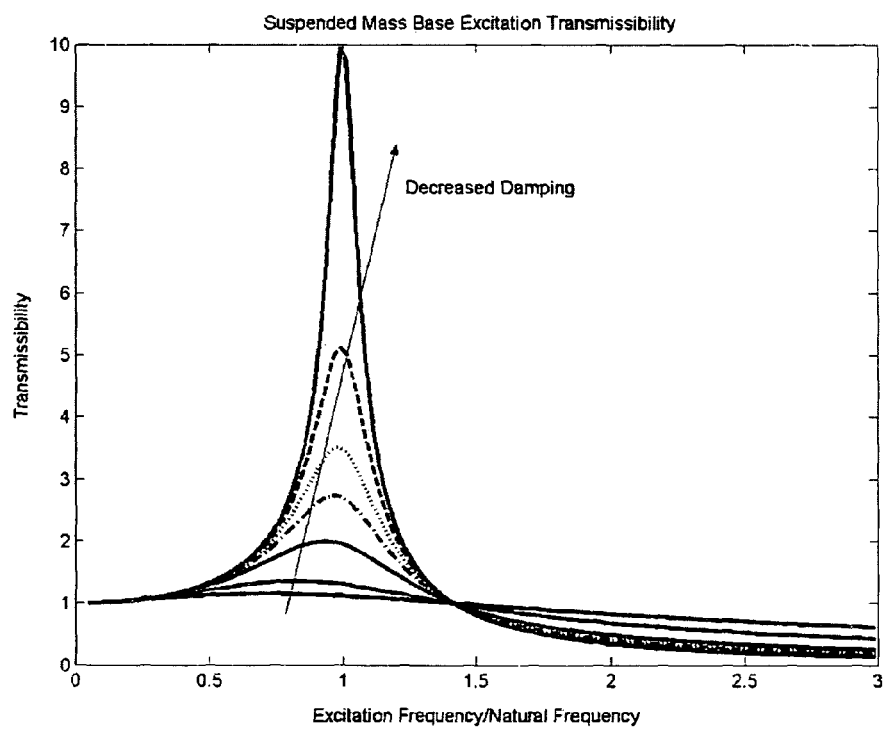
FIG. 2 depicts the transmissibility character of the system of FIG. 1.
Figure 3:
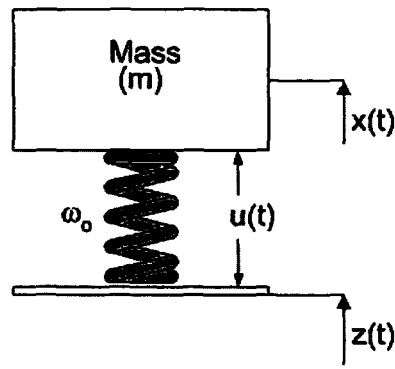
FIG. 3 is a symbolic rendition of a traditional spring/mass system with a variable spring stiffness.

Consider the CVNFD system diagram per FIG. 3. The equation of motion for the isolation system shown is given by $$\ddot{x} + \omega_o^2(t)(x-z) = u(t) \quad (4)$$

where $\omega_o(t)$ represents the nominal spring rate and $u(t)$ represents the control input that provides the variable natural frequency to the system. One strives to provide an $\omega_o(t)$ that will allow the suspended mass to behave in a prescribed fashion. For example, let the prescribed motion be defined by $$\ddot{x} + 2Z\Omega_n(\dot{x}-\dot{z}) + \Omega_n^2(x-z) = 0 \quad (5)$$

where $\Omega_n$ and $Z$ represent the desired apparent natural frequency and damping ratio for the isolator. Let the control law in Equation (4) be given by $$u(t) = -f(t)(x-z) \quad (6)$$

where $f(t)$ is the function to be determined. Now from Equations (4), (5), and (6), one can write the following equation which can be used to evaluate desirable $f(t)+$ $$\ddot{x} + [\omega_o^2 + f(t)](x-z) = \ddot{x} + 2\zeta\Omega_n(\dot{x}-\dot{z}) + \omega_n^2(x-z) \quad (7)$$

Equation (7) can be re-arranged to obtain $f(t)$ as $$f(t) = 2\xi\Omega_n \frac{(\dot{x}-\dot{z})}{(x-z)} + \Omega_n^2 \quad (8)$$

Note that the user sets the values of $\Omega_n$ and $\xi$ as per the desired suspended mass response. The sensory devices are incorporated in the isolator design to measure the relative velocity between the suspended mass and the base and the relative position of the suspended mass with respect to the base. The control law can then be used to set the instantaneous value for effective natural frequency of the system.

A simple example given here demonstrates utilization of the isolator concept. Assume that the desired motion of the suspended mass is consistent with that of critically damped motion at a natural frequency of $2\pi$ radians per second. Also assume that $\omega_o = 0$ for convenience. Then the control input can be computed using the following value of $f(t)$:

$$f(t) = \left[2(1)(6.28)\frac{(\dot{x}-\dot{z})}{(x-z)} + (6.28)^2\right]^{\frac{1}{2}} = \left[1256\frac{(\dot{x}-\dot{z})}{(x-z)} + 39.438\right]^{\frac{1}{2}} \quad (9)$$

Figure 4:
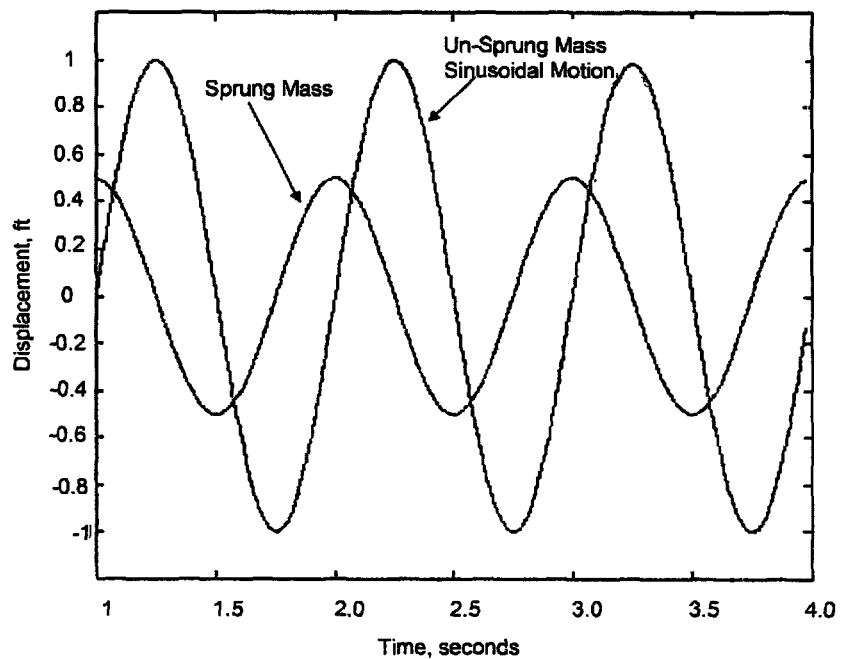
FIG. 4 depicts the response of the system of FIG. 3 for a variable natural frequency corresponding to a critical damping case.
Figure 5:
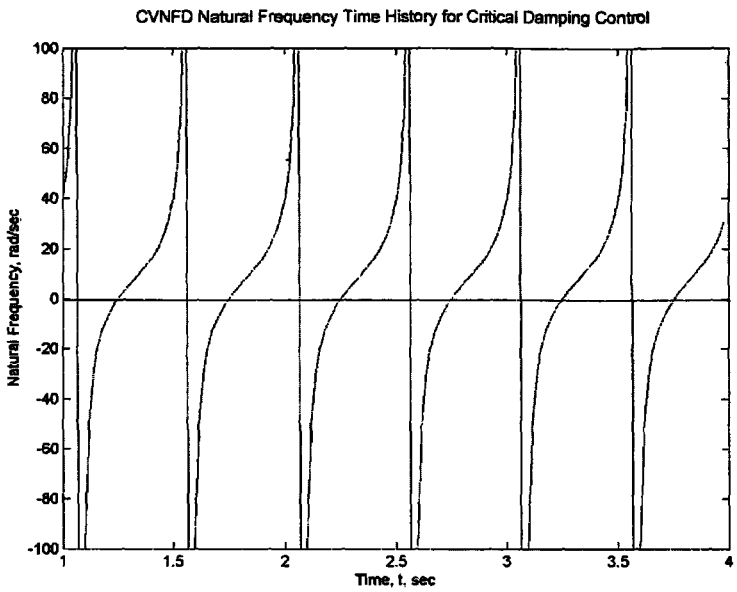
FIG. 5 depicts the natural frequency time history for the system response of FIG. 4.
Figure 6:
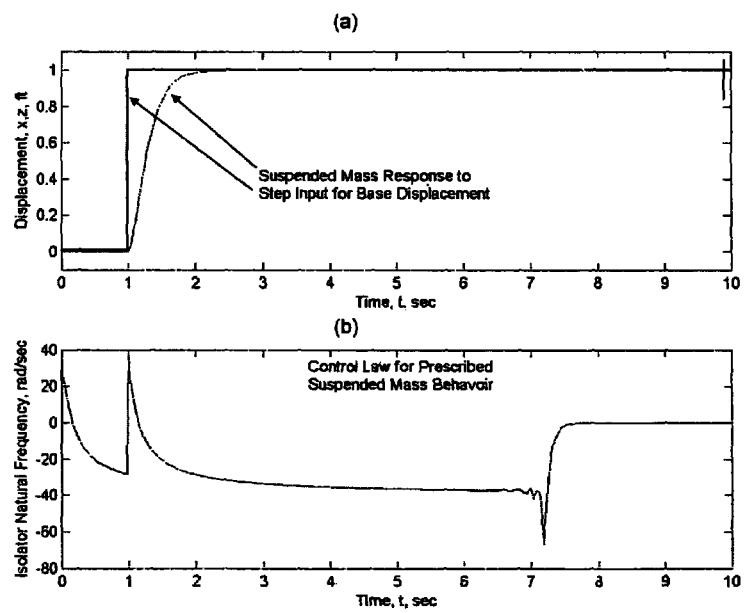
FIGS. 6 (a) and (b) depict the FIG. 3 system response and natural frequency history, respectively, for a unit step input of base displacement.

Furthermore, the closed-loop response of the system is given by FIGS. 4 and 6a, which depict the critically damped solution, $x(t)$, superimposed with the base excitation displacement history, $z(t)$, for sinusoidal and unit step base excitations, respectively. FIGS. 5 and 6b depict the corresponding control law gains $f(t)$ needed to generate critical damping at the prescribed natural frequency per tuning criteria. The above example demonstrates the power of CVNFD isolation system. The choice of the control law provides tuning for two parameters for adjusting vibration isolation quality. One can practically eliminate the damping, if desired, in order to avoid resonance. Overall, the CVNFD concept provides a very robust vibration isolation environment and represents a good choice for the isolation task required of this design. A smart control algorithm may be used that can provide appropriate input in real-time to give desirable system response. The desirable system response may mean varying desirable frequency and damping due to variations in load, wear and tear, uncertainties, etc. This problem may be corrected by designing a robust controller that regulates the orifice opening, a topic covered in subsequent sections.

Physical Systems Possessing CVNFD Characteristics

Isolation components based on a fluid medium provide an excellent basis for potential CVNFD applications. These systems fall into two categories: compressible and incompressible fluid mediums; more specifically, air for the compressible case and hydraulic fluid for the incompressible case. Both provide a basis for CVNFD applications, but with broadly varying attributes per following discussion.

Hydraulic Isolators

Hydraulic isolators can provide a broad range of isolation characteristics but must incorporate a pumping mechanism and related expensive hardware. Moreover, the pumping is needed at all times. Also, hydraulic fluid is heavy and difficult to move in the volume flow rates required for isolation. Pumps required for providing necessary fluid flows tend to be heavy and expensive. In general, hydraulic isolators are not well suited for mobile (non-stationary) systems.

Pneumatic Isolators

Pneumatic isolators can also provide a broad range of isolation characteristics, and it could also require continuous pumping if it is desired to operate in its highest-performance configuration. In that case, the cost and weight would quickly become detrimental, if not prohibitive, in isolator design. However, unlike hydraulic systems, the pneumatic system can provide a relatively broad range of isolation without a pumping requirement due to the compressibility of air. This reality provides an opportunity to design a broadly performing, inexpensive isolator, the essence of this document.

The Pneumatic CVNFD Isolator System

The Open Loop Isolator System Components:

The components for the pneumatic CVNFD system are carefully chosen to provide a 2-parameter isolation system with wide ranging performance capabilities. The components for one embodiment, the open loop isolator, are described in the following sections.

The Air Spring

Figure 7:
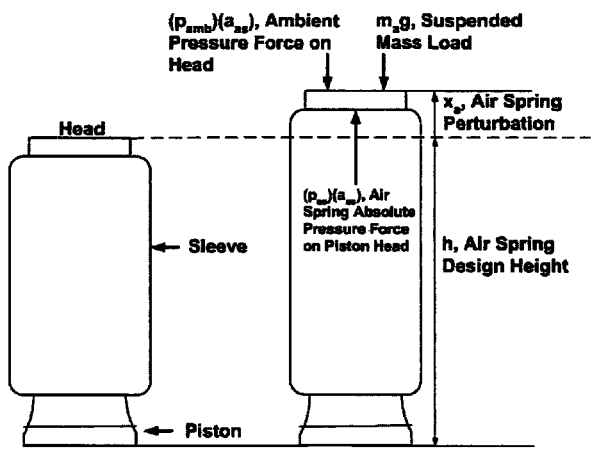
FIG. 7 depicts the standard parts of an air spring bag.

The air spring is the central component in a pneumatic CVNFD isolation system. FIG. 7 depicts a piston-sleeve air spring, one of several available types for air suspension applications. The spring contains three fundamental components—the head, piston, and sleeve. The flexible rubber sleeve is sealed at the top by the head and at the bottom by the piston. The base of the rubber sleeve is fastened to the top of the piston and rolls along the lateral surface of the piston allowing vertical motion of the head.

The air spring behaves much the same as a mechanical spring, a fact that can be verified by linearizing the equations that govern air spring transient motions. The sketch on the left side of FIG. 7 shows the forces acting on the head of an air spring fixed at the base and supporting a suspended mass, m. The following notation is used to delineate the force system acting on the air spring head. The natural frequency of an air spring/suspended mass system with a fixed design diameter is strongly dependent on air spring volume which makes it a primary pneumatic isolator design parameter. Natural frequency decreases with increasing air spring volume.

The Accumulator

The accumulator (FIG. 8) in a CVNFD system is used to establish the lowest natural frequency value that the isolator system must assume. It is a fixed-wall container connected to the air spring by means of a pneumatic flow tube that can allow unrestricted air flow to and from the air spring.

The Variable Orifice/Orifice Drive System

Figure 8:
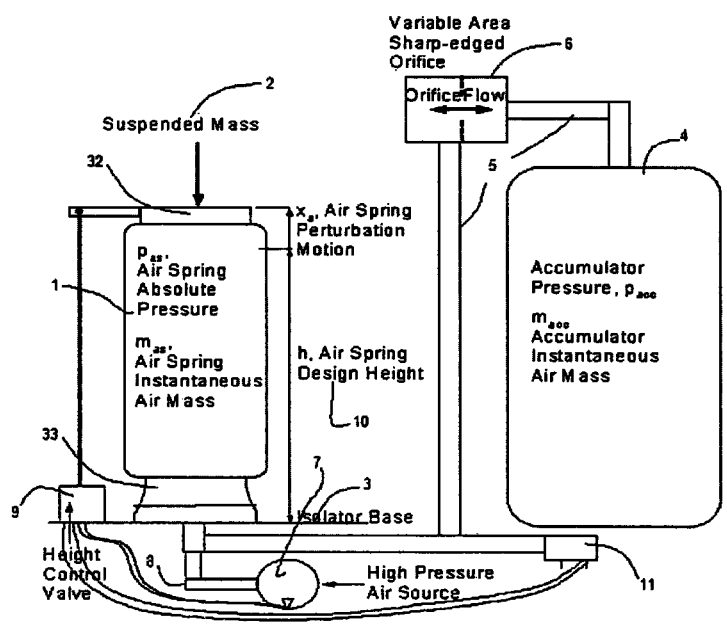
FIG. 8 identifies the basic components and associated connectivity of the proposed basic CVNFD isolation system; the air spring, accumulator, controlled orifice, flow tube, height control valve, pressure source, and exhaust valve.

A sharp-edged orifice with continuously variable orifice area is placed in the pneumatic flow tube for air flow control between the air spring and accumulator (FIG. 8). The primary function for this mechanism is to provide the CVNFD system with a broadly varying damping capability, a phenomenon generated by restricting air spring/accumulator air exchange. The orifice system is designed to provide isolator damping ratios in the zero to critical range. An electro/mechanical orifice drive system provides the orifice setting required for the desired isolator damping ratio.

The Accumulator Volume Modulator

Figure 9:
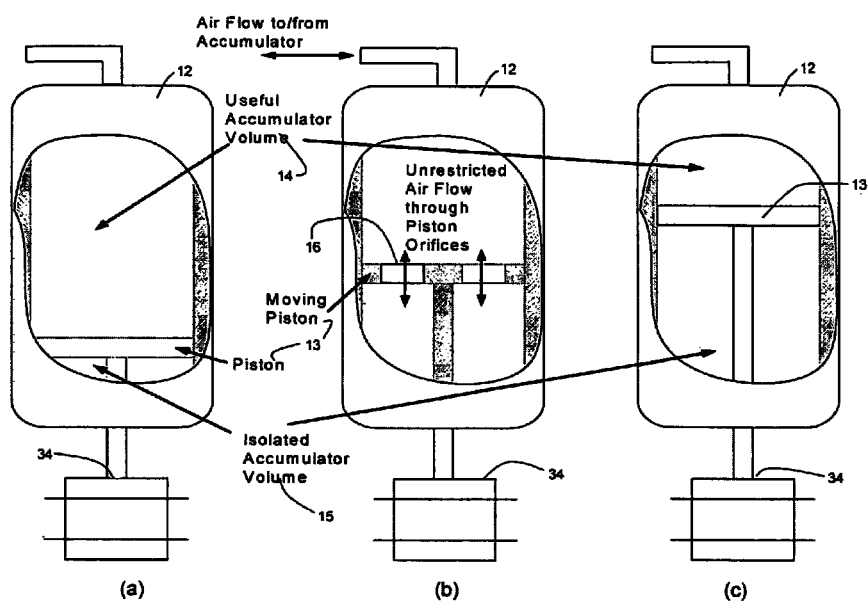
FIG. 9 identifies the components of the variable volume accumulator that provides a variable natural frequency capability for the CVNFD isolator; fixed volume accumulator, porous piston/shaft, and the linear motion transducer.

This CVNFD system component is a piston-like mechanism capable of isolating select regions of the accumulator on demand, thus providing a variable accumulator volume system. The primary function for the modulator is to generate a continuously varying natural frequency throughout the range established by accumulator and air spring volumes. The modulator is contained within the walls of the accumulator as depicted in FIG. 9. The modulator piston has a porous face that allows unrestricted airflow between the useful and isolated volumes of the accumulator only when the piston moves. An electro-mechanical piston driver moves the piston along the accumulator axis per request from a controller.

The Height Control Valve

An air spring design height control valve (FIG. 8) is placed between the suspended mass and the base of the air spring to guarantee that the mass remains, on the average, at a prescribed height above the air spring base. The valve connects the air spring to the high pressure source when the suspended mass rides low and to the atmosphere when high. The height control valve is designed to have a dynamic response that does not allow modification of the transient motion of the suspended mass.

CVNFD System Open Loop Behavior:

Proof of concept for the proposed configuration is made through computational simulations of the system. The following material contains a discussion of the dynamic behavior of the open loop CVNFD system to delineate the robust performance capabilities of the isolator. Results of an in-depth computational simulation of the system are presented showing the broad range of natural frequencies and damping ratios generally available. The natural frequency and damping characteristics as functions of accumulator size and orifice setting are readily defined by solving the governing nonlinear equation of motion for the suspended mass and the equations that govern mass flow rate between the air spring and accumulator.

This system uses two control functions, the instantaneous orifice size and instantaneous accumulator piston position. State dynamics are nonlinear and require numerical integration procedures for solution acquisition. A computational simulation code has been developed, debugged, and is used for simulation studies.

Computational Simulation Results

Fixed Accumulator Volume Case

Dynamics were solved numerically for a unit step input of base deflection. An air spring typical of use in seat suspension is used in the CVNFD model. The air spring had a design height and diameter of 3 inches each. A series of computational simulations, each with a different orifice size, was made for the isolator/suspended mass combination in response to a step input of base deflection. Orifice sizes ranged from zero to maximum. Suspended mass transient motion, recorded for each simulation, appeared to consist of combinations of linear motion modes. Simulation data for each case was post-processed to extract estimates of isolator natural frequency, $\omega_n$, and damping ratio, $\zeta$ as functions of orifice size.

Figure 10:
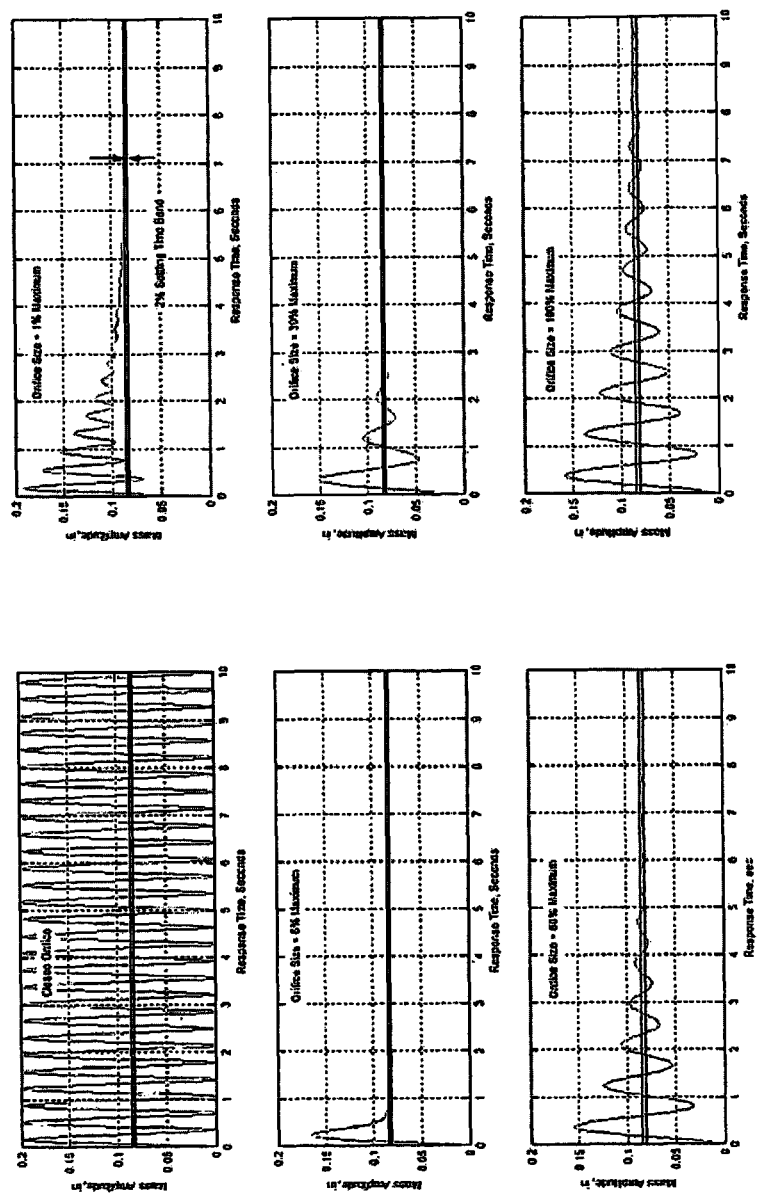
FIG. 10 depicts the step response for the proposed CVNFD isolator with a fixed accumulator volume and 6 different orifice settings.

FIG. 10 depicts suspended mass response for the prescribed base excitation and orifice settings of closed, 1% of maximum, 8%, 30%, 60%, and 100%. The solutions clearly show two regions of transient behavior. In the range of orifice sizes from 0 to 8%, the isolator exhibits a relative constant natural frequency and rapidly increasing damping ratios from near zero to approximately 1. The transient motion appears to consist of a damped sinusoidal mode of motion superimposed on a convergent aperiodic mode. In the range of orifice sizes from 8% to 100%, the motion appears to be a damped sinusoid with natural frequency decreasing from a maximum value to a minimum value while the damping ratio decreases from a near critical value to very low value.

Figure 11:
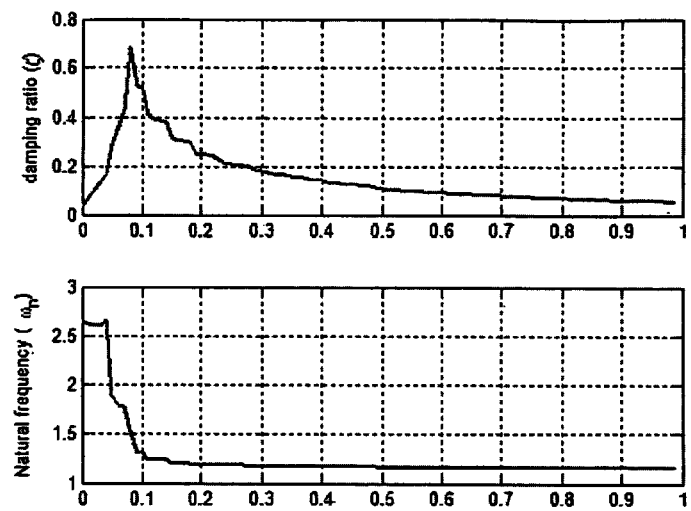
FIGS. 11 (a) and (b) depict natural frequency and damping ratio variation of the CVNFD isolator for a range of values of orifice area and accumulator volume, respectively.
Figure 11:
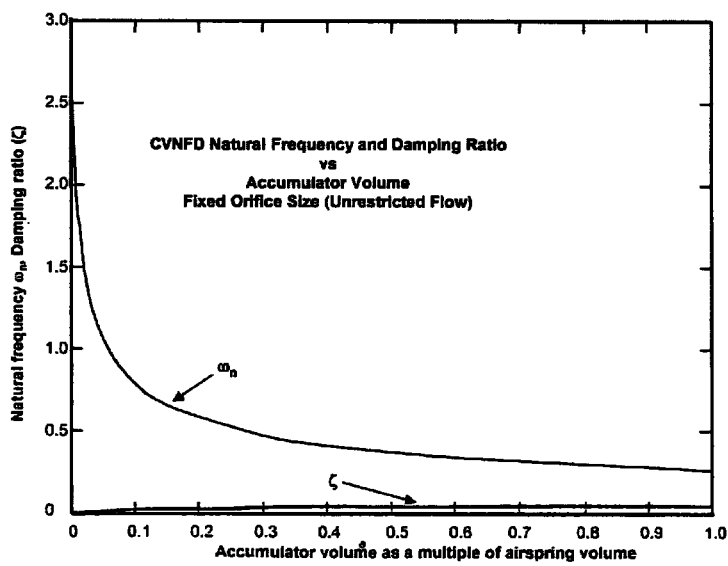

Data for all cases was post-processed to estimate values for natural frequency, $\omega_n$, and damping ratio, $\zeta$. FIGS. 11a and 11b depict the parameter distributions for the computational solutions cited. The plots show a wide range of damping ratios and natural frequencies available for isolator performance. These results are scalable through the range of air springs generally available for vibration isolation applications.

Fixed Orifice Case

Computational simulations similar to the variable orifice study were repeated for a fixed orifice, but variable accumulator volume case to determine the natural frequency variation characteristics for the CVNFD isolator. A series of computational simulations, each with a different accumulator volume, was made for the isolator/suspended mass combination in response to a step input of base deflection. Accumulator volumes ranged from zero to 100 times the air spring volume. Estimates of isolator natural frequency, $\omega_n$, and damping ratio, $\zeta$ as functions of accumulator volume were extracted.

FIG. 11b depicts natural frequency and damping ratio distributions for the computational solutions cited. The plots show a wide range of natural frequencies available for isolator performance. On the other hand, damping ratio remains near zero for an applicable range of accumulator volumes.

Experimental Corroboration of Results

An experimental test to verify the computational simulation results for the CVNFD system was designed and executed. The apparatus incorporated an air spring, suspended mass, accumulator, and orifice system consistent with those used in the computational simulation. System base excitation was provided by an electro-mechanical shaker. Accelerometers placed on the base and suspended mass components were used to measure the transient response for these components. A modern data acquisition/manipulation system was used to excite the shaker, record the input/output signals, and process the data.

Figure 12:
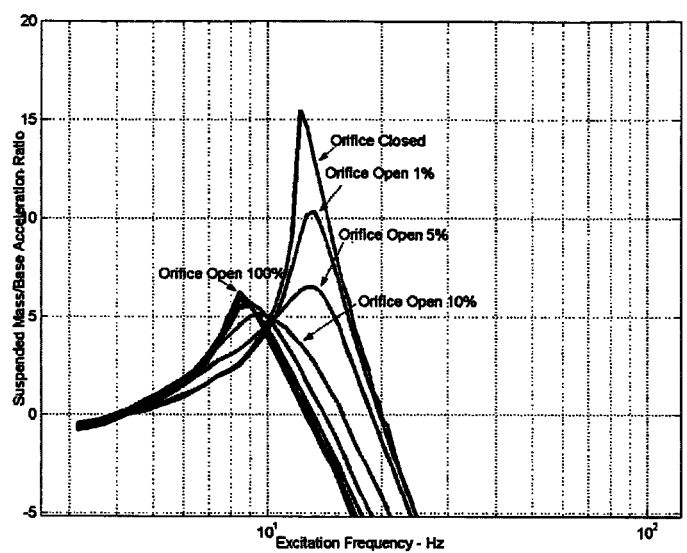
FIG. 12 depicts system acceleration frequency response.

Test program components included shaker amplitude sine sweeps over a wide range of frequencies consistent with CVNFD system response sensitivities. The data acquisition/manipulation system provided corresponding bode plots delineating CVNFD response characteristics. Results obtained for a series of orifice settings from closed to fully open (unrestricted flow) are depicted in FIG. 12. The actual CVNFD response is consistent with the computational simulation results discussed earlier. System response for the closed orifice cases shows little damping and output frequency at the high end of the spectrum. System damping increases quickly as the orifice is opened through small amounts (0-5%), while output frequency remains nearly constant. Beyond these orifice settings, the system output frequencies shift quickly to the low frequency end of the spectrum, and system damping decreases to very low values.

Open Loop Response Summary

The open loop response characteristic for the proposed CVNFD system clearly shows that it is has the potential to provide good isolation for widely varying vibration environments. The range of natural frequencies available through air spring accumulation allows for low-transmissibility isolation. Damping that ranges from very low to near critical values provides the mechanism for arresting unscheduled suspended mass motions. The task that remains, orifice control, is covered in the following section.

The Isolator Control System:

The control system design discussion for the CVNFD will be cast in the context of a quarter vehicle model, an often-used standard for testing vibration isolation systems. Therefore, a tire/carriage mechanism is attached to the base of the CVNFD/suspended mass system discussed earlier per schematic depicted in FIG. 13. This approach enhances the understanding of control system design procedure without loss in generality.

Control System Design

A major part of the CVNFD system feasibility study deals with the design of the controller component and the associated control law that governs the behavior of the isolator. Typically, dynamics of the system must be linearized to provide a basis for a modern control synthesis that will ultimately define the control law for best performance. In some cases, the control laws can be derived from nonlinear dynamics directly.

Using rational assumptions for linearization and after some algebra, the linearized equations can be arranged in state space form as shown below $$\Delta \dot{x} = [A]\Delta x + [B_u]\Delta a + [B_d]\Delta d \qquad (19)$$

where matrices. A, $B_u$, and $B_d$ are functions of system parameters.

All the coefficients in the state-space matrices are constants. The control input to the system is the orifice area $\Delta a$, and the disturbance input affecting the system is in the form of the road displacement $\Delta d$. Hence, the real-time control system which manipulates the timing and extent of opening and closing of the orifice valve, thereby transferring the air from air spring to accumulator and vice versa becomes the brain behind the active CVNFD system. For stable and high performance behavior of CVNFD device, the control system algorithm has to be designed to account for uncertainties, parametric variations, and nonlinearities in the system. This requires the use of robust control design techniques which can systematically address these issues.

Figure 13:
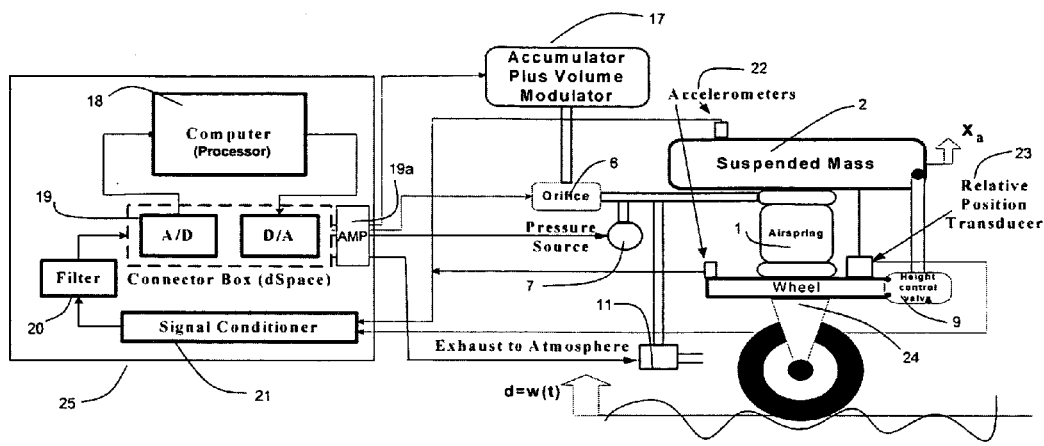
FIG. 13 represents a symbolic layout of a quarter vehicle model incorporating a CVNFD isolation system with controller and associated sensory equipment for providing feedback information for optimal isolator performance.
Figure 14:
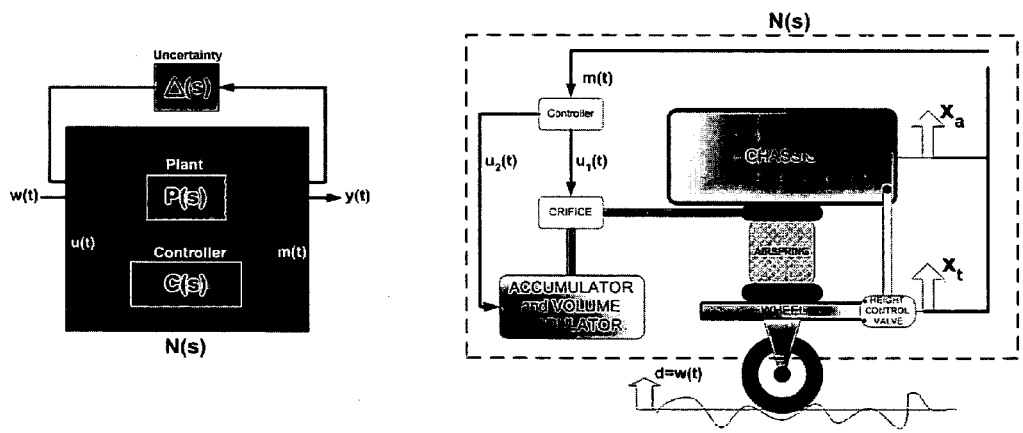
FIG. 14 depicts details of a controller for optimal isolator performance and associated connectivity with a quarter vehicle model.

In recent years, researchers have developed control strategies that can effectively damp the vibrations in mechanical systems. These control designs depend on robust control theory and energy dissipation concept. The control system block diagram given in FIG. 13 shows the overall signal flow. In FIG. 13, $\Delta$, P(s) and C(s) represent the uncertainty, the plant (system), and the controller respectively; and signals w, y, m, and u represent the disturbance, the performance, the measured output, and the control input, respectively. The control design objective will be to synthesize C(s) so as to minimize the vibration energy of the suspended mass P(s) in the presence of w and $\Delta$. Earlier research has yielded various approaches to accomplish this design. Some examples of successful designs include LQG-based controllers, $H_\infty$ controllers and passivity-based controllers. One of the inventors, Dr. Kelkar's research over years has resulted in the development of advanced controller designs that are capable of maximizing energy dissipation and minimizing transmissibility.

Passivity-based methods (a special case of dissipative controllers) or so-called energy-based methods work on the principle of energy dissipation and hence, are the most suited for vibration applications. Such controllers do not destabilize the system by exciting the high frequency dynamics while controlling low frequency disturbances. This is because other control methodologies (like LQG or $H_\infty$) merely result in a redistribution of the energies over different frequencies (known as the "waterbed effect"). However, passivity-based methods do not seek to redistribute energy; instead they seek to dissipate it. To explain in simple mathematical terms, if V (x) represents the energy function of the system where x is the state of the system, then passivity-based controllers yield the control input u(t) such that the $\Delta V$ (x) is always negative definite along the system trajectories implying continuous dissipation of energy. It has been shown that when passivity-based techniques are combined with resonant mode controller designs, the performance of the resulting controller is significantly enhanced. This is especially true for vibratory and acoustic systems which have resonant modes in their dynamics. Such an approach will be ideally suited for the vibration isolation problem where specific natural frequencies will need to be targeted.

CVNFD System Sensory Equipment

Plant performance feedback required by the controller to generate appropriate control function is provided by accelerometers on the suspended mass and base assemblies and a relative displacement transducer, e.g., string potentiometer, placed between the suspended mass and base. FIG. 13 depicts sensory components with appropriate locations and connectivity to controller components for the quarter vehicle configuration.

Extended Performance Pneumatic CVNFD Systems:

The quality of performance delivered by the CVNFD system described above is limited by maximum available accumulator and air spring volumes. The combined volumes govern the minimum natural frequency available, and the air spring volume sets the maximum. Additional components are added to enhance CVNFD system stiffness characteristics per following discussions.

Natural Frequency Range Extender

Figure 15:
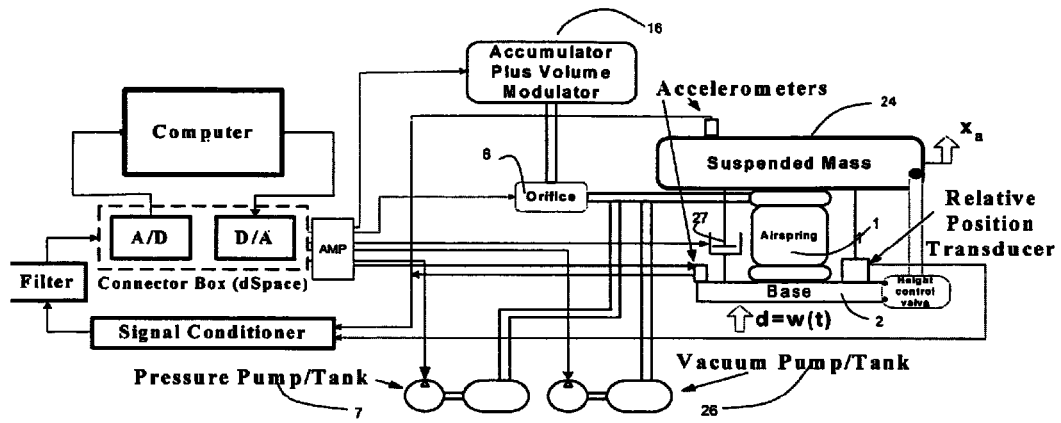
FIG. 15 shows the addition of pressure source and vacuum source components to the standard CVNFD isolation system that enhance performance.

The natural frequency (stiffness) range of the CVNFD system can be enhanced by adding two components to the system. The first component is a high pressure source consisting of an air pump and pressure tank. The second component contains a vacuum pump and vacuum tank (FIG. 15). Each system contains a controllable bleed valve that allows air flow to and from the air spring upon demand by the controller.

CVNFD stiffness is increased by opening the high pressure source to the air spring during compression strokes and by opening the vacuum source to the air spring during extension strokes. CVNFD stiffness is decreased by reversing these procedures. That is, the air spring is connected to the vacuum source during compression strokes and to the high pressure source during extension strokes.

Damping Extender

The damping ratio of the proposed CVNFD system can be further controlled by incorporating a magneto-rheological damper (FIG. 15) placed between the suspended mass and base. The damper is scheduled by the controller as needed.

Series CVNFD Isolator Configurations

Figure 16:
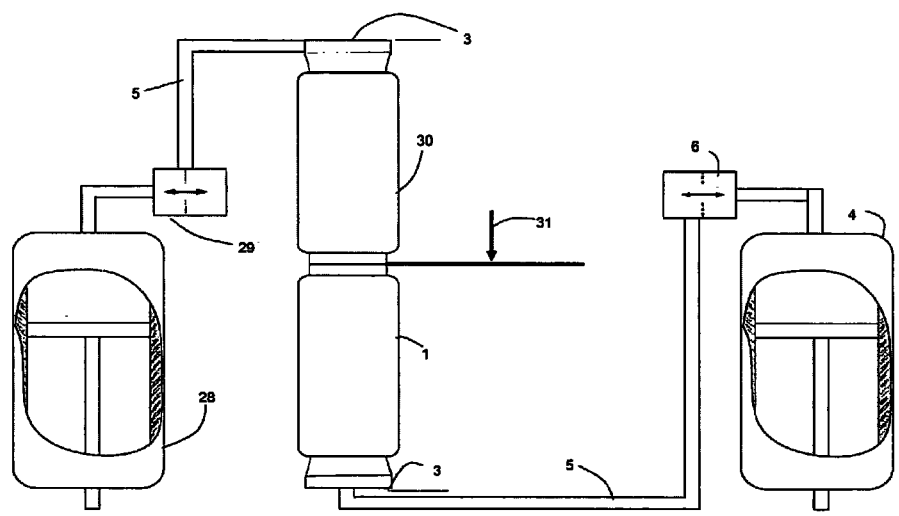
FIG. 16 depicts a compounded CVNFD system incorporating two standard CVNFD systems that provides a broadened range of system stiffness.

CVNFD system overall performance can be broadened by compounding the air spring/accumulator/orifice components using a series configuration. FIG. 16 depicts a series air spring/accumulator/orifice system used in a series-compounded CVNFD system. This provides four control parameters, two orifice areas and two accumulator volumes, for use by the controller to establish high quality vibration free environments. This configuration provides equal damping force ranges for both the upward and downward motions of the suspended mass.

Referring to FIG. 8, an air spring 1 provides a suspension force between a sprung (suspended) mass 2 attached at one end of the air spring (head) 32 and an isolator base 3 to which the air spring (piston) 33 is attached. An accumulator 4 is connected to the air spring 1 by means of a flow tube 5 thus allowing air exchange between the accumulator and air spring at a volume flow rate governed by the pressure differential.

Referring to FIG. 9, the accumulator is rendered variable volume by incorporating a volume modulator comprising an internal movable piston 13 that separates the accumulator into two volumes: useful accumulator volume 14, used to control system natural frequency and isolated accumulator volume 15, and the isolated portion of the accumulator that has no influence on the operation of the system.

FIGS. 9a depicts the accumulator piston 13 positioned such that the useful accumulator volume 14 is large and the isolated accumulator volume 15 is small.

FIG. 9c depicts the piston in a position whereby the useful accumulator volume 14 is small and the isolated accumulator volume 15 is large. The movable piston 13, positioned by means of a linear motion actuator/shaft combination 34, is controllably porous by virtue of a series of bleed ports 16 that allow air mass to move freely between the useful accumulator volume 14 and the isolated volume 15 when the piston is moving, thus maintaining near zero pressure differential between the two portions of the accumulator during piston motion. These ports are closed when the piston is stationary, thus creating non-communicating useful and isolated accumulator volumes. Piston position can be set manually for constant system natural frequency operation or by a computer-controlled electro-mechanical linear motion system for use in a semi-active system. This variable accumulator volume mechanism provides the isolator with a single degree of control in the form of system natural frequency per FIG. 11b.

Referring to FIG. 8, a sharp-edged variable area orifice valve 6 placed in the flow tube 5 path is used to control the degree of communication (continuously variable from 0%, orifice closed, to 100%, orifice open) between the air spring 1 and accumulator 4. A supply of air is provided, and a pump or compressor 7 supplies this air under pressure to flow tube 8, which leads to the air spring and accumulator. An air spring height control valve 9 is used to maintain a prescribed air spring design height 10. This valve connects the high pressure source to the air bag and accumulator 4 when the air spring height exceeds the design value and connects the air spring and accumulator to the atmosphere through an exhaust valve 11 when the air spring height is below the design value. The variable orifice valve 6 and the height control valve 9 can be either passive mechanical devices or computer-controlled electro-mechanical devices in a semi-active application. The orifice valve provides the isolator system with a second degree of control freedom in the form of system damping ratio per FIG. 11a.

Referring to FIG. 13, a typical implementation of the apparatus is depicted in a computer-controlled quarter vehicle model containing a single un-sprung mass 24 consisting of a tire mechanism that traverses an arbitrary terrain and a sprung mass 2 that is to be isolated from vibrations. The isolator air spring 1 is attached at the head end (FIG. 8, 32) to the sprung mass and the un-sprung mass at the piston end (FIG. 8, 33). A multi-component vibration isolation controller 25 is employed to command optimal performance from the isolator system per specified control law. Controller components consist of a computer (processor) 18, an analog-to-digital (A/D) and digital-to-analog (D/A) signal converter box 19, an analog signal amplifier 19a, a signal filter 20, and a signal conditioner 21. Throughout system operation, instantaneous dynamic state of the quarter vehicle model is acquired using accelerometers 22 attached to the sprung and un-sprung masses and a relative position transducer 23 attached between them. These analog acceleration and relative position signals are consecutively passed to the signal conditioner 21, signal filter 20, and the A/D component 19, where they are digitized. The digitized system response signals are then passed to the computer 18 memory where they are incorporated into the control law algorithm execution process to compute appropriate isolation system control input signals, which are then transformed to analog signals by the D/A component 19, amplified by means of an analog signal amplifier 19a, and subsequently sent to the orifice valve 6 and the accumulator plus modulator component 17, thus providing optimal instantaneous values for system damping and natural frequency per FIGS. 11a and 11b. The performance of the isolation system described in FIG. 13 is limited by the maximum and minimum values of spring-plus-accumulator volume which dictates the range of system natural frequency values available to the controller. Referring to FIG. 15, additional isolator performance is achieved by replacing the atmospheric exhaust valve with a vacuum source 26 that allows air to flow from the air spring 1 to the vacuum tank as commanded by the controller, thus decreasing air spring stiffness. In a similar fashion, air spring stiffness is increased by allowing the high pressure source 7 to be connected to the air spring 1, thus allowing air to flow from the source to the air spring as commanded by the controller. A magneto-rheological damper 27 can be implemented for system excitation environments that require additional damping forces beyond those provided by the pneumatic system.

A yet broadened range of isolator system performance is attained by compounding the air spring 1, accumulator plus modulator 16, and orifice 6 components depicted in FIG. 15 as follows. Referring to FIG. 16, a second air spring 30 added to the isolator system is incorporated such that the two air springs 1 and 30 are positioned and attached in a head-to-head arrangement. The air spring bases 3 are attached to the un-sprung mass (FIG. 15, 2) and the sprung mass 31 is supported by the piston heads. The second air spring system includes a separate accumulator plus modulator 28, flow tubes 5 and orifice 29. The second accumulator volume modulator 28 and orifice 29 are connected to and governed by the system controller (FIG. 13, 25). This implementation of the isolator system provides four degrees of control freedom in the form of two natural frequency variables and two damping ratio variables, thus allowing a wide range of performance capability.

Figure 17:
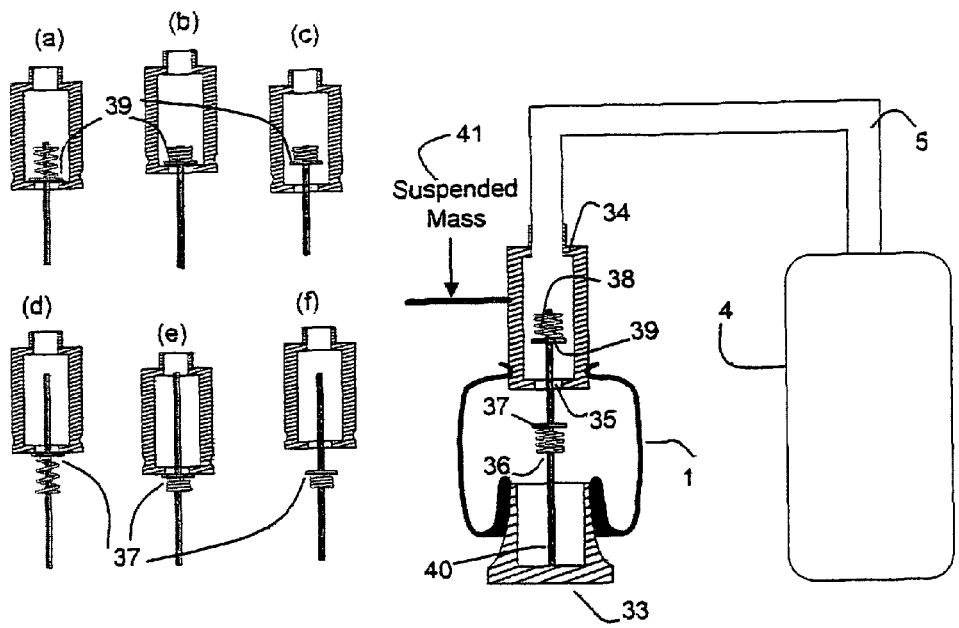
FIG. 17 represents a proposed low-cost passive isolation system derived by reducing the full CVNFD system.

A first subset of the components described in FIG. 15 is assembled to form a passive, low-cost vibration isolation system (FIG. 17) that combines a low system natural frequency, but with recovery modes of motion that prevent air spring compression stroke collapse and an excessive over-extension stroke of the air spring. Referring to FIG. 17, the said apparatus consists of an air spring 1 connected to an accumulator 4 by means of an air flow tube 5 which allows air to flow between the air spring and the accumulator when a pressure differential exists. A slender guide rod 40 rigidly attached to the air spring piston base 33 provides a motion path along which a compression mode orifice disk 37 can slide. A compression mode orifice disk return spring 36 is fixed to the rod 40 at the lower end of the spring and to the orifice disk 37 at the upper end. An over-extension orifice disk 39 is placed on the upper end of the guide rod 40 and is attached to an over-extension return spring 38 at the lower end of the spring. The upper end of the return spring 38 is rigidly attached to the guide rod. The air spring head 34 is a hollow cylindrical body with a pneumatic connector at the upper end for attachment to the flow tube 5. The lower end of the air spring head 34 contains a sharp-edged orifice 35 through which air must pass when moving between the air spring and accumulator.

The operational modes for this apparatus are defined as follows: a first mode of motion, a normal vibration isolation mode, occurs when the suspended mass 41 oscillates such that the orifice 35 surface does not impact the compression mode orifice disk 37 or the over-extension orifice disk 39. In this mode of operation, the orifice 35 moves randomly along the guide rod 40, allowing unrestricted air to flow between the air spring 1 and the accumulator 4. This mode provides a maximum isolation environment (lowest isolator natural frequency) for the suspended mass 41 and is set by the accumulator volume as specified by the designer per data depicted in FIG. 11b.

A second mode of motion, the air spring collapse recovery mode, occurs when the air spring compression motion becomes excessive to the extent that the orifice 35 makes contact with the compression mode orifice disk 37, which instantly isolates the accumulator 4 from the air spring 1 and forces the isolator system into the maximum stiffness state. FIG. 17d depicts the air spring head 34 at the instant the orifice makes contact with the return disk 37. The continued compression motion carries the return disk down the guide rod 40, compressing the return spring 36. The stiffened air spring quickly reaches a maximum compression state as depicted in FIG. 17e. The air spring then begins an extension motion whereupon the compression disk 37 is allowed to move up the guide rod in response to the return spring 36 compressive force. A friction force between the guide rod and the compression disk allows the orifice face 35 to move away from the compression disk 37 (FIG. 17f) during the initial air spring expansion, thus allowing the high pressure air in the air spring to quickly bleed to the accumulator. This action allows the system to quickly return to the maximum isolation mode and prevents a "slingshot" mode whereby the air spring immediately over-extends.

A third mode of motion, the air spring over-extension recovery mode, occurs when the air spring is in a rapid extension state bringing the orifice face 35 into contact with the over-extension disk 39, which seals the orifice 35 as depicted in FIG. 17a. The air spring is immediately isolated from the accumulator, thus allowing air spring pressure to lower quickly and arrest the over-extension motion. The maximum over-extension state is depicted in FIG. 17b which shows the return spring 38 to be in a maximum compressive state. A friction force between the guide rod 40 and the over-extension disk allows the orifice face 35 to move away from the over-extension disk 39 (FIG. 17c) during the initial air spring re-compression, thus allowing the higher pressure air in the accumulator to quickly bleed to the air spring. This action allows the system to quickly return to the maximum isolation mode and prevents an "inverse slingshot" motion by the air spring.

Figure 18:
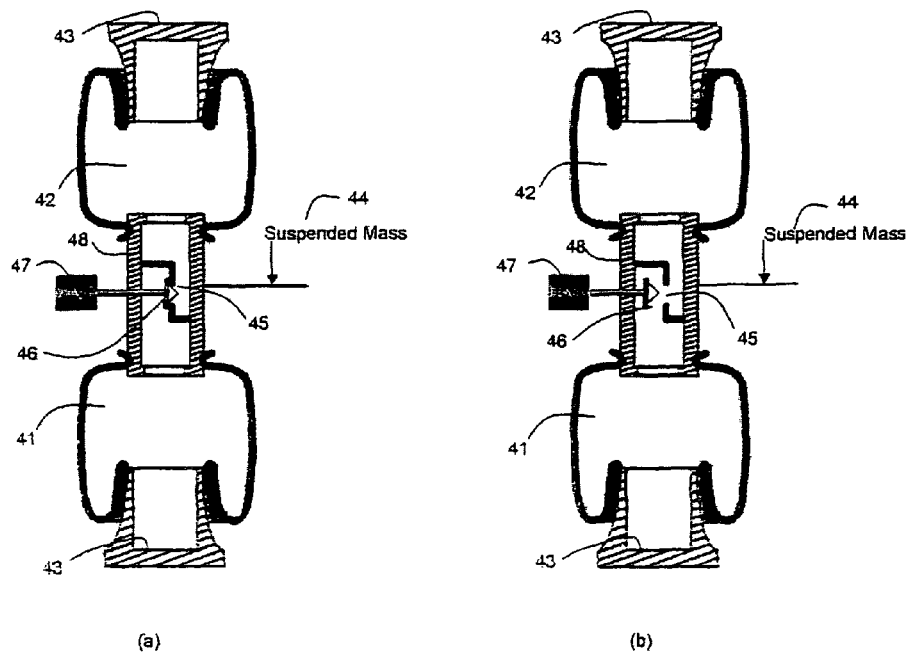
FIG. 18 represents a proposed pneumatic damping device based on CVNFD technology that is capable of generating a wide range of damping forces for implementation in a vibration isolation system.

A second subset of the components described in FIG. 15 is assembled to form a pneumatic damping device that can provide variable and equal damping forces for both compressive and expansion motions of an attached pneumatic damping system. Referring to FIGS. 18a and 18b, the damping device apparatus contains an upper air spring 42 and lower air spring 41 combination that share a common air spring head 48. The upper and lower air spring bases 43 are attached to the un-sprung mass component in a damper application, and the air spring head 48 is attached to the suspended (sprung) mass 44. The head is hollow and open at each end, thus allowing unrestricted flow to and from the respective air spring. A sharp-edged orifice 45 contained within the air spring head 48 allows air to be freely exchanged between the upper 42 and lower 41 air springs when open. An electronic linear motion transducer 47 is used to position an orifice cone 46 with respect to the orifice face 45 to regulate the rate at which air is exchanged between the upper and lower air springs. Air flow rates range from 0 for the orifice closed by the orifice cone case as depicted in FIG. 18a to maximum (unrestricted flow) for the orifice wide open case where the orifice cone is completely removed from the orifice face as depicted in FIG. 18b.

Figure 19:
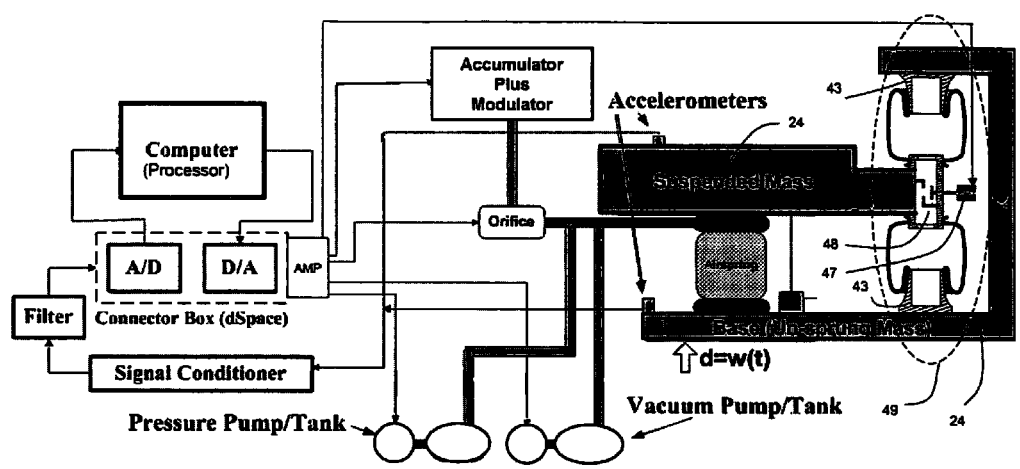
FIG. 19 depicts proper implementation of the pneumatic damping device in a quarter vehicle model incorporating a CVNFD isolation system.

FIG. 19 demonstrates the implementation of this pneumatic damping device in a vibration isolation system. The damper air spring bases 43 are rigidly attached to the un-sprung mass structure 24, and the damper head 48 is rigidly attached to the suspended mass (sprung mass) 24. During system operation, the controller computer executes a specified system control law algorithm, receives signals from system sensory devices and sets the damper instantaneous force through command signals sent to the damper linear motion orifice system 47.

Throughout this detailed description, attention has been primarily focused upon air suspension systems of the type that could be used to isolate loads on trucks and other vehicles. The system could be used for air suspension on seats or sleeper bunks in motor vehicles.

Numerous other uses are possible.

The system as described is focused upon an air system, but it should be understood that it could be used with any type of compressible gas or fluid.

The following terms are intended to be given broad meaning.

"Air spring" is used herein to mean any type of device which uses a compressible fluid to somewhat emulate the performance of a mechanical spring. Air springs are well known in the automotive industry, as well as other industries. The invention is not intended to be limited merely to automotive-type air springs.

"Accumulator" is used herein generally to refer to a fluid container fluidly coupled to an air spring. Such accumulators are well known in the art.

"Continuously variable volume accumulator" is used herein to refer to an accumulator which can be manipulated to change its useful volume. A hollow container with or without an airbag could be used in conjunction with a piston or plunger to change the available volume. Other types of variable volume containers could be used as well, such as accordion or bellows-type of air containers or other suitable devices.

The porous piston approach of the present invention could be accomplished in various ways as well.

"Continuously variable flow regulator" is intended to mean any type of flow regulation device including, but not limited to a sharp-edge orifice, electronically-controlled valves of many types, etc.

"Vacuum source" is used herein to refer to some type of system, device, or tank, etc. which can be used to pull air or other gases from a pneumatic or compressible fluid system rapidly and to remove air or other compressible fluid so as to have a pressure within the system to be below atmospheric pressure.

"High pressure air (compressible fluid) source" is used herein to refer to a source of air or compressible fluid which can be, but need not be delivered at a pressure higher than atmospheric pressure. "High pressure air source" is intended to include systems which are similar to air pressure sources for existing air suspension systems, but shall also include source of air and compressible gases at higher and lower pressure with respect to the prior art systems used for automotive air suspension systems.

"Accelerometer" is used herein to refer to a device to measure movement and changes in motion of and generating a signal in response to the motion or change of motion. Simple self-contained inertia based linear accelerometers may be used, as well as optical, electronic, rotational sensors and more elaborate mechanical or electro/mechanical measurement, indexing or tracking systems could be used.

"Suspended mass" is used herein to refer to any type of load, not just the chassis and payload of a vehicle, or a vehicle seat and passenger or a bed and person resisting thereon.

"Controller" is used herein to refer to any type of machine or device which provides a control signal which could be electrical, magnetic, optical, mechanical, or other signal types.

"Computer" could be used herein to be synonymous with "controller", or it could be a super set or subset of components thereof.

The term "coupled" is used herein to refer to having some cooperative relationship which may include direct or indirect physical attachment, but it may also include a direct or indirect non-physical functional cooperation.

We claim:

1. Apparatus for isolating movement of a suspended mass, the apparatus comprising:
    a high pressure compressible fluid source for supplying compressible fluid under pressure when directed by a controller;
    a vacuum source for rapidly evacuating compressible fluid under pressure when directed by a controller;
    a compressible fluid spring for receiving high pressure compressible fluid from the high pressure compressible fluid source;
    a compressible fluid spring head at one end of the compressible fluid spring for attachment to a suspended mass being isolated from vibrations;
    a compressible fluid spring piston at another end of the compressible fluid spring for attachment to an un-sprung mass which is a mass generating the vibrations, the compressible fluid spring piston for causing the suspended mass and the un-sprung mass to be pushed apart when compressible fluid under pressure is allowed to enter the compressible fluid spring;
    whereby gravity and suspended mass weight cause the suspended mass and the un-sprung mass to move closer together when fluid is relieved in said compressible fluid spring;
    a relative position transducer coupled with said compressible fluid spring and configured for measuring a separation distance with respect to the suspended mass and generating a compressible fluid spring height control signal for actively controlling access of said compressible fluid spring to said vacuum source and said high pressure compressible fluid source;
    a variable volume accumulator in fluid communication with the compressible fluid spring for increasing an effective compressible fluid volume of the compressible fluid spring, thereby modifying the natural frequency of the compressible fluid spring;
    means for controlling a continuously variable flow rate of compressible fluid between the compressible fluid spring and the variable volume accumulator at a prescribed rate, thereby allowing the compressible fluid spring to operate with a variable damping ratio caused by variable velocity dependent resistive force;
    where said means for controlling comprises a controlled sharp-edged orifice configured for variable adjustments.

2. Apparatus as defined in claim 1, wherein said means for controlling comprises a continuously variable orifice electrically coupled to an amp.

3. Apparatus as defined in claim 2, wherein said amp is responsive to said compressible fluid spring height control signal.

4. Apparatus as defined in claim 3,
    including a continuously variable accumulator volume control device for allowing the variable volume accumulator to assume a continuously variable volume character, thereby allowing the compressible fluid spring to operate with a continuously variable natural frequency.

5. Apparatus for a continuously variable natural frequency and damping system comprising:
a high pressure air source device for supplying air under pressure when directed by a control;
an air spring for receiving high pressure air from the air source;
an air spring head housing a sharp-edged orifice at one end of the air spring for attachment to a sprung mass;
an air spring piston housing an effective orifice area control mechanism at another end of air spring for attachment to an un-sprung mass for causing the sprung mass and un-sprung mass to be pushed apart when air under pressure is allowed to enter the air spring;
a variable volume accumulator in fluid communication with the air spring for increasing an effective air volume of the air spring, thereby modifying a natural frequency of the air spring.

6. An air suspension system comprising in operative combination:
a first mass to be isolated from predetermined forces;
a second mass which transmits the predetermined forces;
an air spring, disposed between the first mass and the second mass, so as to assist in isolating the first mass from the predetermined forces; and
a continuously variable volume accumulator, fluidly coupled to the air spring, so as to permit continuous variability in a natural frequency of the air spring.

7. The air suspension system of claim 6 wherein the continuously variable volume accumulator comprises a single container which may be configured to have any of an infinite number of volumes within predetermined limits.

8. An air suspension system of claim 6 further comprising an electronically-controlled vacuum source configured to evacuate air from the air spring.

9. An air suspension system of claim 6 further comprising a continuously variable flow regulator disposed between the air spring and the continuously variable volume accumulator so that a continuously variable damping ratio can be achieved.

10. An air suspension system of claim 9 wherein the continuously variable flow regulator is an electronically-controlled sharp-edged orifice.

11. An air suspension system of claim 10 further comprising electronic sensors configured to measure displacement between the first mass and the second mass and a computer configured to vary a damping ratio by making continuously variable adjustments in one of a setting of an electronically-controlled sharp-edged orifice.

12. A method of isolating a suspended mass, comprising the steps of:
providing an air spring;
providing an accumulator coupled to the air spring; and
continuously varying a damping ratio of the air spring by continuously varying an orifice disposed between the air spring and the accumulator.

13. A method of claim 12 further comprising the steps of:
continuously varying a natural frequency characteristic of the air spring by continuously varying a volume characteristic of the accumulator.

14. Apparatus for isolating movement of a suspended mass, the apparatus comprising:
a high pressure compressible fluid source for supplying compressible fluid under pressure when directed by a controller;
a compressible fluid spring for receiving high pressure compressible fluid from the high pressure compressible fluid source;
a compressible fluid spring head at one end of the compressible fluid spring for attachment to a suspended mass being isolated from vibrations;
a compressible fluid spring piston at another end of the compressible fluid spring for attachment to an un-sprung mass which is a mass generating the vibrations, the compressible fluid spring piston for causing the suspended mass and the un-sprung mass to be pushed apart when compressible fluid under pressure is allowed to enter the compressible fluid spring;
whereby gravity and suspended mass weight cause the suspended mass and the un-sprung mass to move closer together when fluid is relieved in said compressible fluid spring;
a relative position transducer coupled with said compressible fluid spring and configured for measuring a separation distance with respect to the suspended mass and generating a compressible fluid spring height control signal for actively controlling access of said compressible fluid spring to said high pressure compressible fluid source;
an accumulator in fluid communication with the compressible fluid spring for increasing an effective compressible fluid volume of the compressible fluid spring, thereby modifying the natural frequency of the compressible fluid spring;
an electronically controlled continuously variable flow rate controller connected between the compressible fluid spring and the accumulator for allowing compressible fluid to flow from the compressible fluid spring to the accumulator at a prescribed rate as directed by a controller and from the accumulator to the compressible fluid spring at a prescribed rate directed by a controller, thereby allowing the compressible fluid spring to operate with variable damping ratio;
said electronically controlled continuously variable flow rate controller comprising an electronically controlled sharp-edged orifice configured for continuously variable adjustments.

15. An apparatus of claim 14 further comprising:
a vacuum source for rapidly evacuating compressible fluid under pressure when directed by a controller;
and where:
the relative position transducer coupled with said compressible fluid spring and configured for measuring a separation distance with respect to the suspended mass and generating a compressible fluid spring height control signal is further configured for actively controlling access of said compressible fluid spring to said vacuum source;
a continuously variable accumulator volume control device for allowing the accumulator to assume a continuously variable volume character, thereby allowing the compressible fluid spring to operate with a continuously variable natural frequency;
wherein all of the controllers are a single controller comprising a computer, signal conditioner, signal filter, an analog-to-digital signal conversion unit, and a digital-to-analog signal conversion unit with signal amplifier;
the single controller further comprising signal input ports for acquiring feedback information devices for identifying instantaneous system dynamic state, signal output ports for sending control signals to the electronically-controlled continuously variable flow rate controller, high pressure compressible fluid source, and the vacuum source;

whereby the single controller defines control signal values for an output port function based on control law algorithms that govern vibration isolation system behavior.

16. Apparatus as defined in claim 15 wherein the feedback information devices comprise accelerometers attached to each of the suspended mass and the un-sprung mass, and a relative displacement device attached between the suspended mass and the un-sprung mass.

* * * * *